US008473647B2

(12) United States Patent
Vidal et al.

(10) Patent No.: US 8,473,647 B2
(45) Date of Patent: Jun. 25, 2013

(54) METHODS AND APPARATUS FOR DECREASING POWER CONSUMPTION AND BUS ACTIVITY

(75) Inventors: Alberto Vidal, Madrid (ES); David Ferguson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/901,518

(22) Filed: Sep. 17, 2007

(65) Prior Publication Data

US 2009/0077277 A1 Mar. 19, 2009

(51) Int. Cl.
*G06F 3/00* (2006.01)
*G06F 5/00* (2006.01)
*G06F 13/00* (2006.01)
*G06F 13/24* (2006.01)
*G08C 17/00* (2006.01)
*H04L 12/28* (2006.01)
*H04L 12/42* (2006.01)

(52) U.S. Cl.
USPC .......... 710/46; 710/6; 710/8; 710/15; 710/16; 710/18; 710/29; 710/60; 710/107; 710/260; 370/311; 370/395.4; 370/449

(58) Field of Classification Search
USPC 710/6, 8, 15, 46, 60, 260, 107, 305; 709/202, 709/224, 227, 206, 235; 714/7, 748; 370/311, 370/329, 449, 395.4; 719/321; 711/112, 118; 455/67.11; 375/130
See application file for complete search history.

(56) References Cited

U.S. PATENT DOCUMENTS

| 4,017,835 | A | * | 4/1977 | Randolph ................. 379/91.01 |
| 4,100,533 | A | * | 7/1978 | Napolitano et al. ..... 340/825.22 |
| 4,449,182 | A | * | 5/1984 | Rubinson et al. ............... 710/60 |
| 4,616,359 | A | | 10/1986 | Fontenot |
| 4,654,656 | A | * | 3/1987 | Deaver et al. ................. 370/449 |
| 5,243,596 | A | | 9/1993 | Port et al. |
| 5,432,462 | A | | 7/1995 | Obregon et al. |
| 5,500,650 | A | * | 3/1996 | Snodgrass et al. .............. 342/42 |
| 5,799,196 | A | | 8/1998 | Flannery |
| 5,896,561 | A | * | 4/1999 | Schrader et al. ........... 455/67.11 |
| 6,101,550 | A | | 8/2000 | Zucker |
| 6,259,627 | B1 | * | 7/2001 | Wong ....................... 365/185.21 |
| 6,356,984 | B1 | * | 3/2002 | Day et al. ...................... 711/147 |

(Continued)

OTHER PUBLICATIONS

An Efficient and Fair Polling Scheme for Bluetooth, Yeng-Zhong Lee, Rohit Kapoor, Mario Gerla, UCLA Computer Science WAM Lab, Los Angeles CA, 90095, XP-002505030, pp. 1062-1068, Oct. 7, 2002.

*Primary Examiner* — Idriss N Alrobaye
*Assistant Examiner* — Henry Yu
(74) *Attorney, Agent, or Firm* — Gazdzinski & Associates, PC

(57) ABSTRACT

Methods and apparatus for enhancing efficiency (e.g., reducing power consumption and bus activity) in a data bus. In an exemplary embodiment, a client-driven host device state machine switches among various states, each comprising a different polling frequency. A client device on the data bus (e.g., serial bus) checks for non-productive periods of polling activity, and upon discovering such a period, informs the host. The state machine then alters its polling scheme; e.g., switches to a lower state comprising a reduced polling frequency, and polling continues at this reduced frequency. In one variant, the client device continuously monitors itself to determine whether it has any data to transmit to a host device and if so, the host is informed, and the state machine restarts (e.g., to its highest polling state). By eliminating extraneous polling, power consumption and serial bus activity is optimized, potentially on both the host and the client.

20 Claims, 10 Drawing Sheets

U.S. PATENT DOCUMENTS

| | | | |
|---|---|---|---|
| 6,622,178 B1* | 9/2003 | Burke et al. | 710/15 |
| 6,640,268 B1* | 10/2003 | Kumar | 710/46 |
| 6,876,690 B1* | 4/2005 | Imbeni et al. | 375/130 |
| 6,880,027 B1* | 4/2005 | Oguro | 710/107 |
| 6,898,751 B2* | 5/2005 | Aikawa et al. | 714/748 |
| 6,938,103 B2* | 8/2005 | Azzarito et al. | 710/6 |
| 6,990,542 B2* | 1/2006 | Nguyen | 710/260 |
| 7,073,006 B2* | 7/2006 | Nguyen | 710/260 |
| 7,216,265 B2* | 5/2007 | Hughes et al. | 714/55 |
| 7,391,746 B2* | 6/2008 | Morimoto et al. | 370/311 |
| 7,581,019 B1* | 8/2009 | Amir et al. | 709/235 |
| 2002/0087285 A1* | 7/2002 | Chew | 702/117 |
| 2003/0101308 A1* | 5/2003 | Chang et al. | 710/305 |
| 2003/0197488 A1 | 10/2003 | Hulvey | |
| 2003/0200372 A1 | 10/2003 | Doragh | |
| 2003/0200393 A1* | 10/2003 | Cornaby et al. | 711/118 |
| 2003/0204557 A1* | 10/2003 | Mandal et al. | 709/202 |
| 2004/0025099 A1* | 2/2004 | Aikawa et al. | 714/748 |
| 2004/0088480 A1* | 5/2004 | Fox et al. | 711/112 |
| 2004/0123169 A1 | 6/2004 | Elnozahy | |
| 2004/0205474 A1* | 10/2004 | Eskin et al. | 715/500 |
| 2005/0195828 A1* | 9/2005 | Klein et al. | 370/395.4 |
| 2005/0240808 A1* | 10/2005 | Dor et al. | 714/7 |
| 2006/0153238 A1* | 7/2006 | Bar-On et al. | 370/473 |
| 2007/0013446 A1* | 1/2007 | Navil et al. | 331/16 |
| 2007/0088834 A1* | 4/2007 | Litovski et al. | 709/227 |
| 2007/0288629 A2* | 12/2007 | Taylor et al. | 709/224 |
| 2008/0192767 A1* | 8/2008 | Howe et al. | 370/449 |
| 2008/0209448 A1* | 8/2008 | Ayres et al. | 719/321 |
| 2008/0259853 A1* | 10/2008 | Ito | 370/329 |
| 2008/0294731 A1* | 11/2008 | Roy | 709/206 |

* cited by examiner

METHODS AND APPARATUS FOR DECREASING POWER CONSUMPTION AND BUS ACTIVITY

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data networks and buses. More particularly, in one aspect, the present invention is directed to reducing power consumption and/or bus activity over a serial bus network.

2. Description of Related Technology

In a typical network (such as that employing a serialized protocol such as USB or the like), software running on a host device configures the host controller to continuously or periodically poll each client device in order to determine if a given client has data to transfer to the host. This polling occurs generally irrespective of the actual amount of data designated for transfer to the host over a certain period of time. Thus, in situations where a client has no data to send to the host over a significant period of time, significant system resources are often diverted to facilitate a largely non-productive polling process.

Each time the host polls a client over a typical serial bus, three events of interest occur. First, a portion of the available bus bandwidth must be used to transmit the polling message from the host to the client, and to transmit the corresponding response from the client back to the host (or a designated proxy). In situations where no data is ready or available to be sent to the host, the aforementioned process uses up available bus bandwidth for what is largely extraneous signaling.

Second, for every polling request sent from the host to the client, the host must access at least one descriptor or other data structure stored in its main memory. These repeated accesses of the host's memory necessitate the use of inter alia processor pipeline bandwidth, and accordingly consumes significant amounts of power in the host device.

Third, the client must use up power in responding to the constant barrage of polling signals. When the client has no data to send to the host, this polling becomes wholly unnecessary, and power is expended on generating a stream of negative responses. If the client device happens to be a battery-powered device (as many USB devices are), this power consumption will shorten the client's battery life significantly, thereby leading to reduced user satisfaction and other possible disabilities.

Moreover, the aforementioned approach to polling is host-driven; i.e., the host or its proxy issues the polling message to which the client responds. This can be a disability in certain contexts, since the host often has no relevant information (or at least the capacity to analyze such information) regarding the state, power situation, etc. of the client(s) that it is polling. Stated differently, there may be more opportune times, situations, and/or mechanisms to use in communicating with a client process than purely a "dumb" periodic polling (i.e., one which is rote in nature, and operates irrespective of the client process or device condition) of the type taught in the prior art.

In such cases, it may also be desirable to have the client process/device control at least aspects of the communication, versus merely having it react to instigation from a host or host proxy.

Prior art devices have attempted to mitigate the foregoing problems in a variety of ways. For example, U.S. Pat. No. 5,432,462 to Obregon, et al. issued Jul. 11, 1995 entitled, "Input buffer circuit having sleep mode and bus hold function" discloses an input buffer circuit having sleep mode and bus hold capability. An input section of the buffer circuit is operated from an operating voltage which is lower than a supply voltage of the buffer circuit thereby minimizing the static power dissipation. Sleep mode circuitry is included for effectively disconnecting an input signal from the rest of the buffer circuit thereby minimizing dynamic power dissipation. Bus hold circuitry is included for holding the logic state appearing at an output of the input buffer circuit when the input signal is removed thereby further reducing the static power dissipation.

U.S. Pat. No. 5,799,196 to Flannery, Michael R. issued Aug. 25, 1998 entitled, "Method and apparatus of providing power management using a self-powered universal serial bus (USB) device" discloses the capability of a peripheral bus to provide an alternative low power source is combined with existing power management software that controls a computer's main power supply unit to provide stand-by power to logic in the computer that remains active to monitor the system environment for predetermined wake-up events. A self-powered Universal Serial Bus device supplies the minimal power needed by the active logic without the inefficiencies of a dual-stage power supply unit or the expense of incorporating both low-power and a full-power units.

U.S. Pat. No. 6,101,550 to Zucker issued Aug. 8, 2000 entitled, "Method and structure for interrupt polling signal bandwidth allocation in universal serial bus (USB) system" discloses a Universal Serial Bus controller that includes an allocation unit configured to allocate bandwidth to a plurality of nodes in a polling list, each node being capable of storing at least one descriptor representing a respective polling signal. The nodes are arranged in a binary tree structure having a plurality of leaf nodes, a root node, and at least one level of intermediate nodes which are successor nodes for the leaf nodes and predecessor nodes for the root node.

"Sleep", "Suspend", "Pause", and similar commands are well known in the data networking arts. See, e.g., U.S. Pat. No. 4,616,359 to Fontenot, and U.S. Pat. No. 5,243,596 to Port, et al., which disclose generally the use of "stop" packets or pause frames to throttle packet delivery over a network. These approaches are generally associated with data flow (e.g., receipt FIFO buffers) and are irrespective of power management considerations. A pause frame is issued by the receiving entity when the conditions are met (e.g., incoming FIFO at a high-water mark or the like), and released by a "resume" or similar frame transmitted by the recipient when the condition clears or other such criteria are met. Timeouts can also be used; e.g., stop sending packets for a prescribed period of time when the trigger condition has been reached, and then resume.

Similarly, in the particular context of USB, the "Suspend" command can be used to put the bus in a suspended state, and thus halt all bus traffic, including the polling between the host and the client. However, communications over the bus cannot resume until a corresponding USB "RESUME" signal sent from the host occurs. If the client re-instates communication the latency associated with the USB Resume command is on the order of tens milliseconds, this will significantly hamper bus performance, and is therefore impracticable for all intents and purposes (including those related to control of polling messaging, etc.).

Despite the foregoing approaches, the prior art neither teaches nor suggests an effective technique for reducing polling activity associated with a bus in order to, inter alia, reduce bus activity and power consumption.

Additionally, prior art solutions tend to focus completely on host-centered approaches, rather than one which allows for a client-driven approach, or even a hybrid of the two (or one utilizing information from an external source).

Accordingly, what is needed are methods and apparatus for reducing bus activity (specifically unnecessary activity) in order to preserve power in both the host and the client, and also to free up available bus bandwidth for useful operations. At the same time, such methods and apparatus ideally should not significantly impede bus performance due to e.g., latencies associated with bus operations, or for any other reason. These methods and apparatus would be particularly useful in the context of high-speed serialized bus protocols (e.g., USB, IEEE-Std. 1394, etc.), where such latencies and non-productive polling operations currently extract a premium.

SUMMARY OF THE INVENTION

The present invention satisfies the foregoing needs by providing, inter alia, methods and apparatus for the reduction of power consumption and bus activity in a network.

In accordance with a first aspect of the invention, a data device adapted to communicate with a second device over a bus is disclosed. In one embodiment, the bus comprises a serial bus, and the device comprises: logic configured to poll the second device, the polling occurring according to a first polling scheme; logic configured to receive a signal from the second device, the signal indicating to the data device to poll the second device according to a second scheme; and logic configured to poll the second device according to the second scheme.

In a second aspect of the invention, a method of operating a data device is disclosed. In one embodiment, the method comprises: in a first state, polling a client of the data device according to a first scheme; receiving a signal from the client to change to a second state; changing the data device to a second state; and in the second state, polling the client according to a second scheme.

In a third aspect of the invention, a method of operating a data device that polls a client device in data communication therewith is disclosed. In one embodiment, the method comprises: operating the data device in a first state, the first state comprising at least one of a first polling scheme and a first state transition scheme; identifying an event; and based at least in part on the act of identifying, changing at least one of the first polling scheme or the first state transition scheme to a second polling scheme or state transition scheme, respectively.

In a fourth aspect of the invention, a client device adapted to communicate with a host device over a serial bus is disclosed. In one embodiment, the host device is adapted to poll the second device to determine whether the client device has data to be transferred to the host device, and the client device comprises: a first module adapted to determine whether the host device should poll the client device at a different frequency than the client device is currently being polled; and a second module adapted to transmit a signal to the host device, the signal indicating to the host device to poll the client device at the different frequency.

In a fifth aspect of the invention, a method for use in a data device adapted for being polled by a second device is disclosed. In one embodiment, the method comprises: determining whether the second device should poll the data device according to a different scheme than a first scheme used currently to poll the data device; and transmitting a signal to the second device, the signal indicating to the second device to poll the data device according to the different scheme.

In a sixth aspect of the invention, a control system is disclosed. In one embodiment, the control system is adapted for efficiently polling and transferring data between first and second devices across a serial bus, and comprises: a state machine having a plurality of polling states associated therewith; and control logic adapted to communicate with the state machine and implement at least one polling scheme using the state machine and polling states. In one variant, the state machine is disposed substantially on the first device, and the control logic is disposed substantially on the second device. The first device comprises a host device, and the second device a power-restricted client device, and the serial bus a USB-compliant bus.

In a seventh aspect of the invention, a state machine for use in polling operations is disclosed. In one variant, the state machine comprises a finite state machine (FSM), and is disposed on the host device and controlled at least in part by a client process or logic. In another embodiment, the state machine comprises an event-driven FSM.

In an eighth aspect of the invention, a computer readable medium adapted for inter-device polling is disclosed. In one embodiment, the medium comprises a storage device having a computer program disposed thereon, the program being adapted to selectively poll one or more client devices based on evaluation of one or more parameters (e.g., non-productive polling intervals, etc.).

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 8 is a logical flow diagram illustrating one exemplary implementation of the generalized state machine depicted by FIG. 7a.

DETAILED DESCRIPTION OF THE INVENTION

Figure 1A:
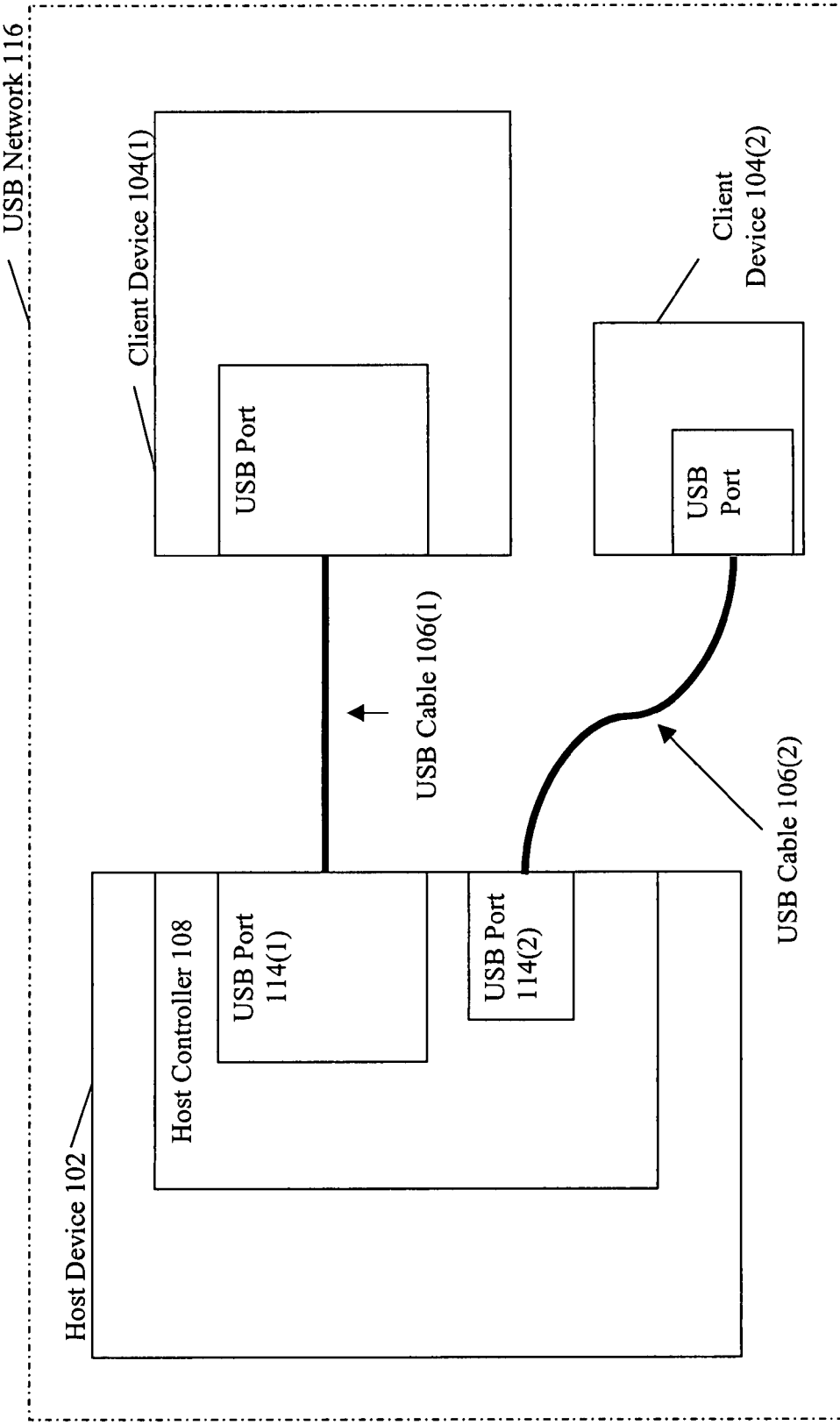
FIG. 1A is a functional block diagram illustrating two client devices connected to a host device via USB cables in a typical prior art USB serial bus network.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, video cameras, personal media devices (PMDs), such as for example an iPod™, or Motorola ROKR, LG "Chocolate", and smartphones, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "poll" or "polling" refers to, without limitation, and communication, signal, action, or query which either elicits a response from a device, or by which information can be obtained from such device.

As used herein, the term "serial bus" refers without limitation to any bus or other data transfer, transmission, receipt, or interface structure adapted to operate according to a serialized protocol. Examples of such serialized protocols include the USB (universal serial bus) protocol, USB 2.0, USB On-The-Go, etc.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus for decreasing power consumption and bus activity in a data network (e.g., over a serial bus). Salient aspects of the present invention include, among others: 1) the conservation of electrical power (e.g., preservation of battery life in battery-powered client devices); 2) the elimination of extraneous transactions over the bus, thus freeing up bandwidth for useful operations; 3) the reduction of power consumption at the host device via e.g., reduction of processor overhead and memory accesses.

As previously noted, a host device (e.g., USB host) may repeatedly poll a USB client device to determine whether the client has any data to transfer to the host. This polling occurs frequently and continuously, irrespective of the actual amount of data that has been designated for transfer to the host over a given period of time. It is therefore one of the primary goals of the present invention to reduce and/or eliminate this unnecessary polling.

As stated above, each time the host polls a client, three things happen, which various aspects of the present invention serve to address. First, a portion of the available bus bandwidth must be used to transmit the polling message from the host to the client and the corresponding response from the client back to the host. In situations where no data is to be sent to the host, this uses up available bus bandwidth for extraneous signaling. Second, for every polling request sent from the host to the client, the host must access at least one descriptor or data structure stored in its memory. This consumes significant amounts of power in the host device. Third, the client must use up power in responding to the constant litany of polling signals. When the client has no data to send to the host, this polling is wholly unnecessary, and power is expended on generating a stream of negative responses. If the client device happens to be a battery-powered or other such device with finite power storage or access (as many USB devices are), this extraneous power consumption may shorten the client's operating or duty cycle significantly.

An exemplary embodiment of the present invention addresses each of these issues by providing an adaptive approach; i.e., a state machine adapted to progressively switch to lower and lower polling frequencies upon the discovery of periods of non-productive polling—e.g., periods where several consecutive polling messages have been sent from the host to the client, all of which have been negatively acknowledged by the client. Upon detecting such a period, the client informs the host (or the host detects this period itself), and the state machine then switches to a state utilizing less polling (and likewise, less corresponding power use and associated bus activity). As each successive period of non-productive polling is detected, the state machine progressively switches to a lower or less intensive polling state. In its lowest state, all polling between the host and client device is halted.

In accordance with one variant, the client continually searches for the presence of data that is designated for transfer to the host device. This searching process occurs in every state. Upon detecting such data, the client informs the host, and the state machine restarts in its highest state (the state with the most amount of polling occurring). Note that when the state machine is in its highest state, delay between successive proximate or contiguous transfer operations is minimized, since the polling frequency is at its highest.

In other embodiments, different polling schema are utilized, such as where e.g., the state machine traverses directly to the lowest state based on a deterministic, speculative or probabilistic determination of whether a data transfer will occur during a prescribed period, thus achieving the highest possible performance and lowest latency. A polling "burst" mode is also disclosed, wherein the client (or host) can invoke an accelerated polling rate during times when minimum latency is desired or required.

The foregoing improvements are particularly useful in the context of high-speed serialized data buses (e.g., USB, IEEE-Std. 1394) in mobile devices, where excess or non-productive polling both exacts a heavy toll in terms of performance, and depletes the client (and possibly even the host's) precious and limited battery resources at an accelerated rate. The invention is also particularly well suited to any bus where a single controlling entity (such as a host) polls the status of clients, and this polling affects other resources such as bandwidth or power, such as e.g., in many wireless protocols.

Detailed Description of Exemplary Embodiments

Exemplary embodiments of the present invention are now described in detail. While these embodiments are discussed in terms of a serial bus that is compliant with the Universal Serial Bus (USB) standard, it will be recognized by those of ordinary skill that the present invention is not merely limited to a USB compliant serial bus. Various other applications and embodiments are also possible in accordance with the invention, and considered to be within the scope thereof.

Moreover, while discussed primarily in the context of a basic two-device topology, it will be appreciated that other topologies (e.g., one host, multiple clients, one client, multiple hosts, etc.) may be used consistent with the invention.

Additionally, while the term "endpoint" is used in the present context, this should in no way be considered limiting; i.e., a client device or other entity may or may not comprise a logical or physical "endpoint" within the network.

Furthermore, while some embodiments are shown in the context of a wired data bus or connection (e.g., a cable,), the invention is equally applicable to wireless alternatives or interfaces such as, without limitation, 802.11, 802.16, PAN, Bluetooth, infrared or optical interfaces, and the like.

Figure 1B:
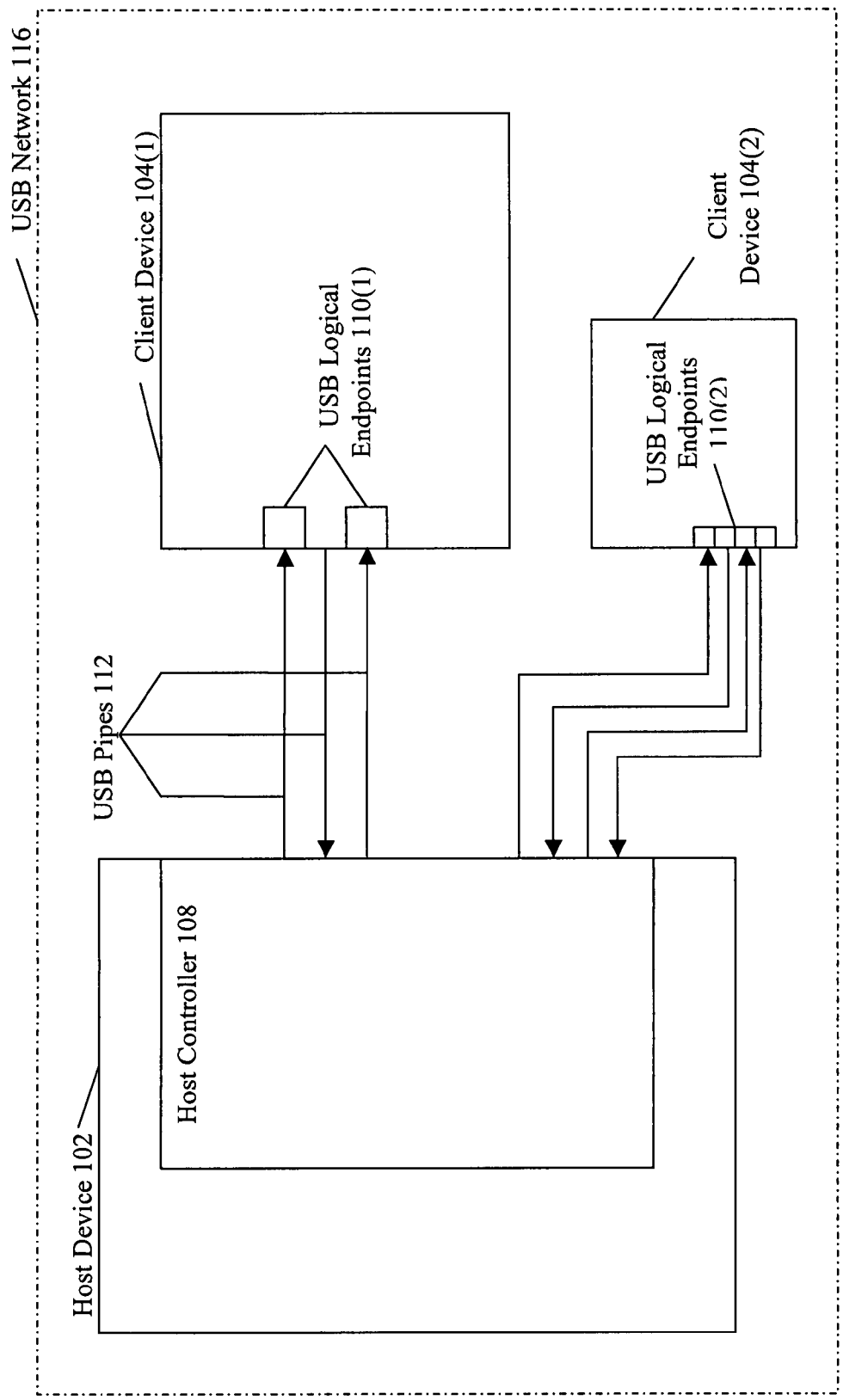
FIG. 1B is a logical block diagram illustrating two client devices in data communication with a host device by a plurality of data pipes.

FIGS. 1A and 1B illustrate a common prior art network topology of a USB serial bus network 116, at a physical and logical level, respectively. A USB host controller 108 connects a host device 102 (such as a notebook or personal computer) to one or more USB client devices 104, thus forming the USB serial bus network 116. The host controller 108 of FIG. 1A comprises one or more USB ports 114, each adapted to receive a USB cable 106 and associated connectors. Note that current USB standards also allow for configurations where the host controller 108 is connected to a first client device 104, which is connected to a second client device 104, which is connected to a third 104, and so on, thus allowing for an entire USB serial bus network 116 to be on a single daisy chain (not shown).

A plurality of logical channels (herein referred to as "pipes" 112) run from the host controller 108 to a logical entity on the client device known as an endpoint 110. These endpoints 110 (and their respective pipes 112) in the illustrated example are numbered 0-15 in each direction, so that a single device can have up to 32 active pipes—16 running into a given device and 16 running out of the device. Note that each pipe 112 in this illustration transfers data in one direction only.

Figure 2:
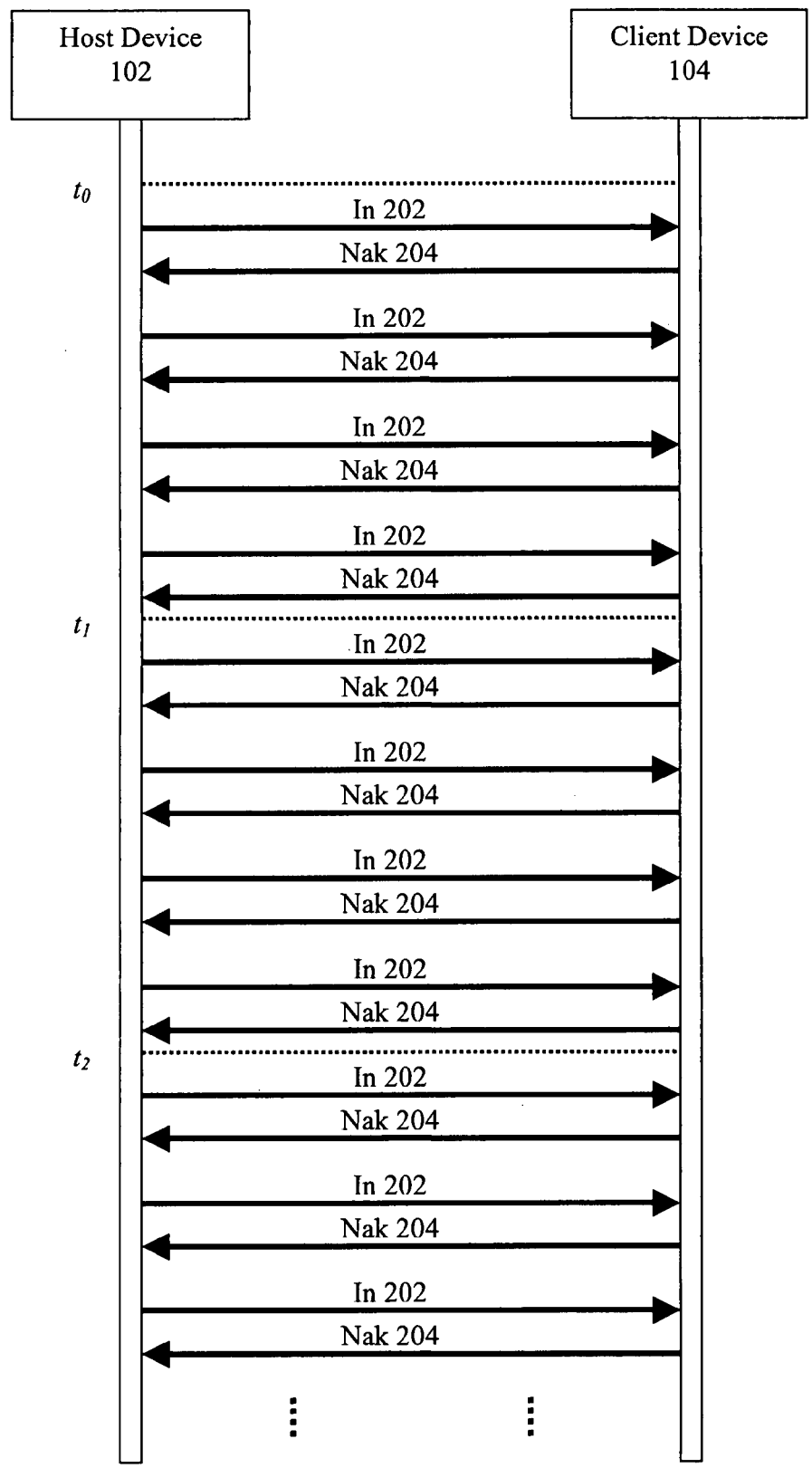
FIG. 2 is a sequence diagram illustrating a typical polling exchange between a host device and a client device in accordance with the prior art.

FIG. 2 is a sequence diagram illustrating a typical prior art polling scheme involving a USB host device 102 polling a USB client device 104 (FIG. 1A) over an extended period of time. The host device 102 begins by asking the client device 104 whether the client device 104 has any data to transfer "in" to the host device 102. This is designated as an "in-request" 202 in the present example. If the client device 104 determines that it has data to be transferred to the host 102, it responds to the host 102 with an acknowledgement (called an "ACK"), followed by the actual data designated for transfer (as discussed supra, with respect to FIGS. 4 and 6).

On the other hand, if the client device 104 does not have any data to be transferred to the host 102, it responds merely with a negative acknowledgement (called a "NAK" 204). Under the prior art polling scheme as depicted in FIG. 2, this polling occurs frequently and at a prescribed periodicity (effectively continuously), regardless of any number or period of consecutively repeated NAKs 204 or other information.

Figure 3:
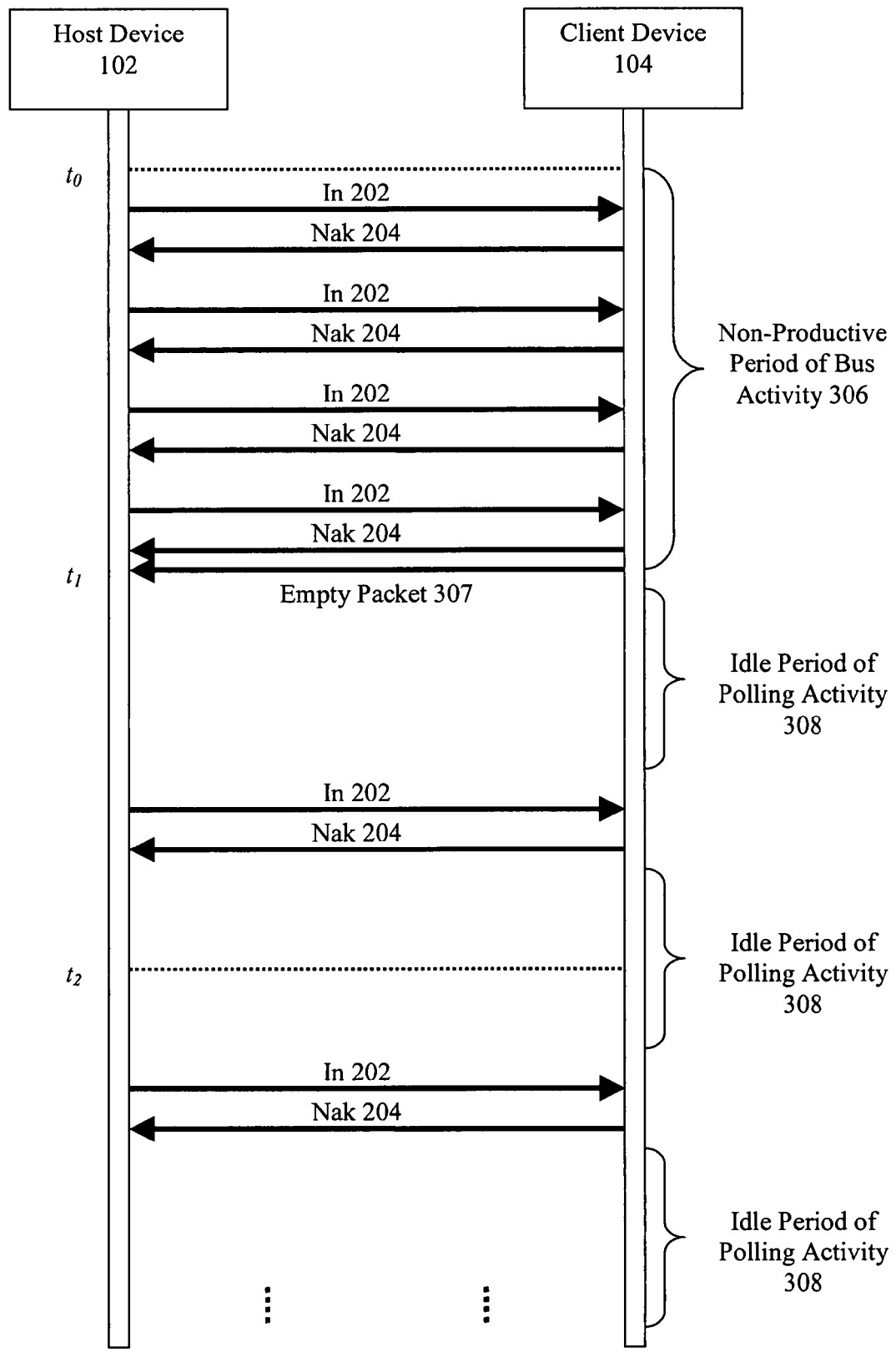
FIG. 3 is a sequence diagram illustrating a first polling sequence according to a first embodiment of the present invention

FIG. 3 is a sequence diagram illustrating a polling scheme in accordance with one embodiment of the present invention. In this embodiment, client device 104 (e.g., a device driver, although other processes or entities within the client device, or a designated controlling proxy, may be used) regularly checks for a non-productive period of polling activity 306. The non-productive period of polling activity 306 in this embodiment is determined by the detection of four consecutive NAKs 204; however, the number (four) is merely illustrative, and the actual number of NAKs 204 comprised within one non-productive period of polling activity 306 can be set to any number in accordance with the scope of this invention. Additionally, the number of NAKs may be dynamically determined and adjusted; e.g., four (4) during a first period or operating condition, three (3) during a second period or operating condition, and so forth. Alternatively, the controller can monitor to determine periods when no data has been transferred, thereby indicating inactivity (i.e., instead of counting the number of NAKs).

In another embodiment, the non-productive period of polling activity 306 is determined by the amount or rate of data transferred from the client 104 to the host 102, as opposed to being measured by consecutive NAKs 204. For example, if the amount of data (e.g., total bytes) transferred over a given period is large, then the determination of non-productivity is given a higher threshold; i.e., significant data transferred per unit time is considered per se "productive".

In still another embodiment, the determination of nonproductivity is made based at least in part on a duration rather than a number of NAKs received or issued. In many cases, there is a direct correspondence between the number of NAKs and an elapsed period of time (e.g., regular polling at X times per second will result in a known period of elapsed time). However, in cases where a periodic or situational/anecdotal polling is used (e.g., polling upon the occurrence of a certain event, such as completion of a data transfer), the time period and polling interval may not be directly related.

Receive/transmit buffer contents (e.g., level, rate of change, etc.) or other such indicia within the client can also be used as the sole or partial determinant of when such non-productive polling has occurred, or when there is an anticipated latency between the next data transmission event. To this end, buffers on yet other device upstream can also be examined; e.g., if the client is receiving data that it will transmit to the polling host from an upstream device, that upstream device can act as the source of "look-ahead" information for purposes of relaxing the polling interval or otherwise altering the polling scheme.

Once a non-productive period of polling activity 306 has been detected, or another reason to alter the polling scheme or operation, the client device 104 driver sends a signal to the host device 102 which is interpreted by the host 102 as a command to alter its scheme (e.g., reduce its frequency) of polling. In the embodiment depicted in FIG. 3, the signal sent by the client comprises a zero-length or empty data packet 307, but other signals can alternatively be utilized to accomplish the same effect in accordance with the scope of this invention. For example, one or more flag bits or other such data elements within a frame or packet can be set to indicate the client's desire for a polling scheme change.

In one embodiment, the client device 104 transmits the polling frequency to the host device 102 along with the signal. In the case of two flag bits for example, $2^2$ or 4 different schemes or states can be communicated by the client, such as e.g., four different polling rates or frequencies, which may be selected based on a determination by the client (or another entity) of the impending likelihood of a subsequent data transfer, or merely according to a predetermined scheme (such as reduce one increment, poll for n periods, reduce one more increment, and so forth). In another embodiment, the client 104 designates an appropriate delay period for the host device 102 to use before the host sends out each poll to the client 104.

It will also be appreciated that in addition to an "in-band" data channel, one or more sideband or out-of-band channels can be used for signaling the foregoing polling control signals. For example, in some embodiments, the signals are transmitted from the client 104 to the host 102 over sideband channels, as opposed to in-band channels. This can be implemented in a variety of ways, including, for example, the use of certain USB "pipes" dedicated to this purpose, or alternatively, by the use of a completely separate transmission medium (for example, separate cables and/or a peripheral network). As yet another alternative, the channel used for such signaling can be selected adaptively; e.g., as a function of the bandwidth consumption of the primary or in-band channel, so as to minimize adding any further overhead to the primary channel when it is loaded significantly. This type of "intelligent" channel selection may be controlled, e.g., using an algorithm or computer program, firmware, etc. or other means as desired.

Upon receiving the signal (e.g., empty data packet 307), the host device 102 adjusts its polling scheme, such as by reducing the polling frequency accordingly. In the embodiment depicted in FIG. 3, the new polling frequency is equal to one-third of the original polling frequency, but this amount is also used for purposes of illustration, and may be varied based on the application. The polling frequency can be reduced by any amount or percentage in accordance with the scope of the present invention, and may even be reduced deterministically (e.g., based on one or more other parameters or variables, such as bandwidth consumption, remaining battery life, etc.). In this fashion, the reduction in polling frequency can be adaptively tailored to the prevailing operational or other conditions of the host/client device. In the simple case of remaining battery life or charge, more aggressive reductions in polling frequency would be desired in cases where the client and/or host's battery is low, thereby conserving the battery to the maximum degree. Other such schemes will be readily appreciated by those of ordinary skill given the present disclosure.

As can be readily seen in the example of FIG. 3, upon reducing the frequency of polling, various idle periods of polling activity 308 advantageously replace the periods where polling would otherwise occur, thereby achieving the desired goals of reduced bandwidth consumption, power consumption, and processor overhead.

Figure 4:
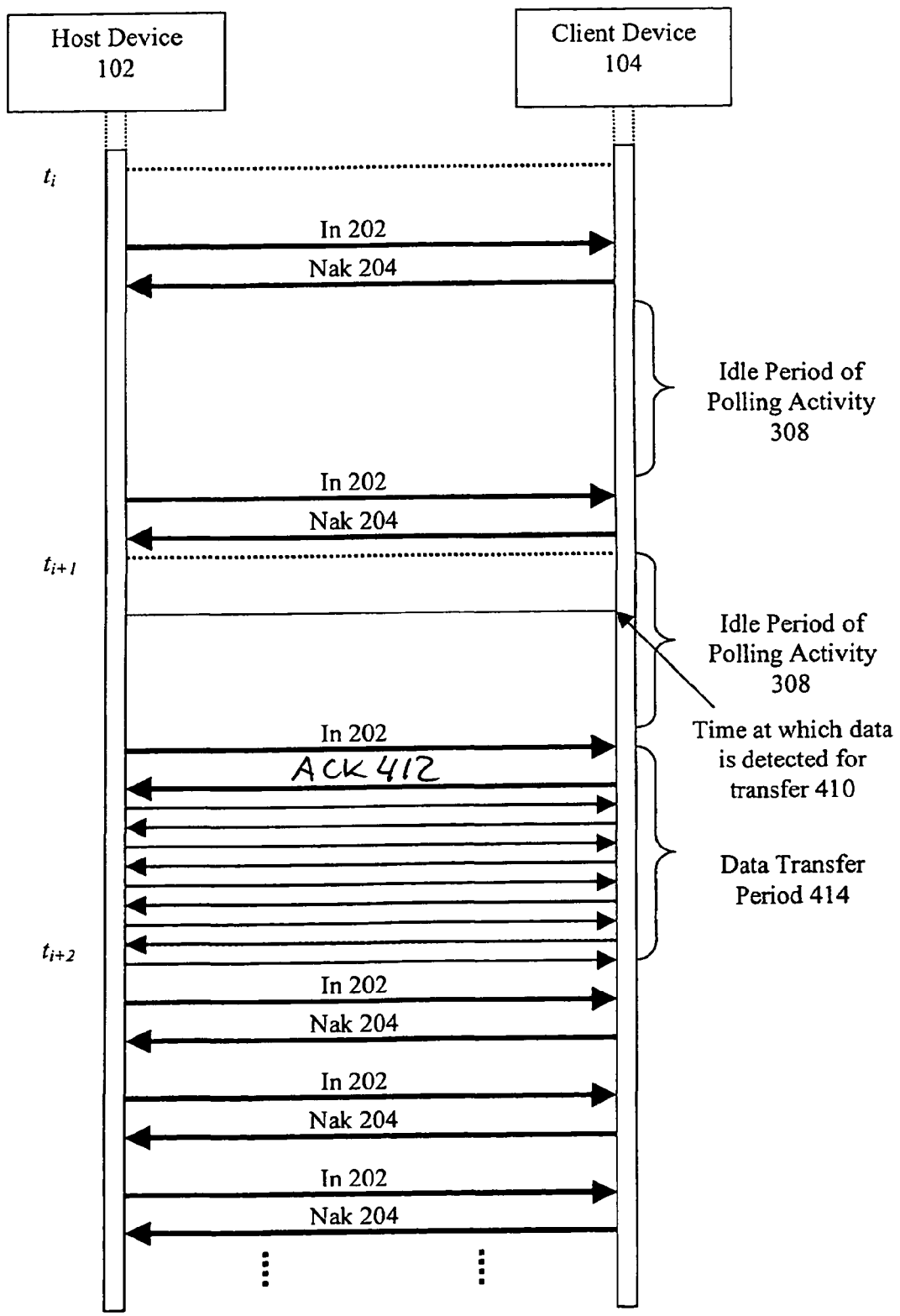
FIG. 4 is a sequence diagram illustrating a second polling sequence according to a second embodiment of the present invention.

FIG. 4 is a sequence diagram illustrating a polling scheme in accordance with another embodiment of the present invention. For the purposes of FIG. 4, it is assumed that the client device 104 has already detected the presence of a non-productive period of polling activity 306, and has reduced the frequency of polling as per FIG. 3.

In the embodiment depicted by FIG. 4, the client device 104 periodically monitors itself to determine whether it has data to transfer to the host device 102. Eventually, the client device 104 detects the presence of such data at a first time 410. Upon detecting this data, the client device 104 waits for the next in-request 202 before sending an ACK 412 to the host 102. In one variant, the receipt of an ACK 412 by the host 102 triggers the restoration of the original polling frequency (in this case, the frequency of polling as given in the period from $t_0$-$t_1$ in FIG. 3). Note however that various other triggers may be used to accomplish the same purpose in accordance with the present invention including e.g., expiration of a timer or period of time, input signal regarding other activity within the client process or device (e.g., indicating that a data transfer may be impending, transfer of the host/client device from battery to a continuous power source, etc.).

The transfer of data then occurs during the data transfer period 414. When the transfer has finally completed, the polling of client device 104 continues at its original frequency (or another prescribed scheme, such as e.g., a ramping of frequency up or down over time) and in one variant, the process repeats as per FIG. 3.

Figure 5:
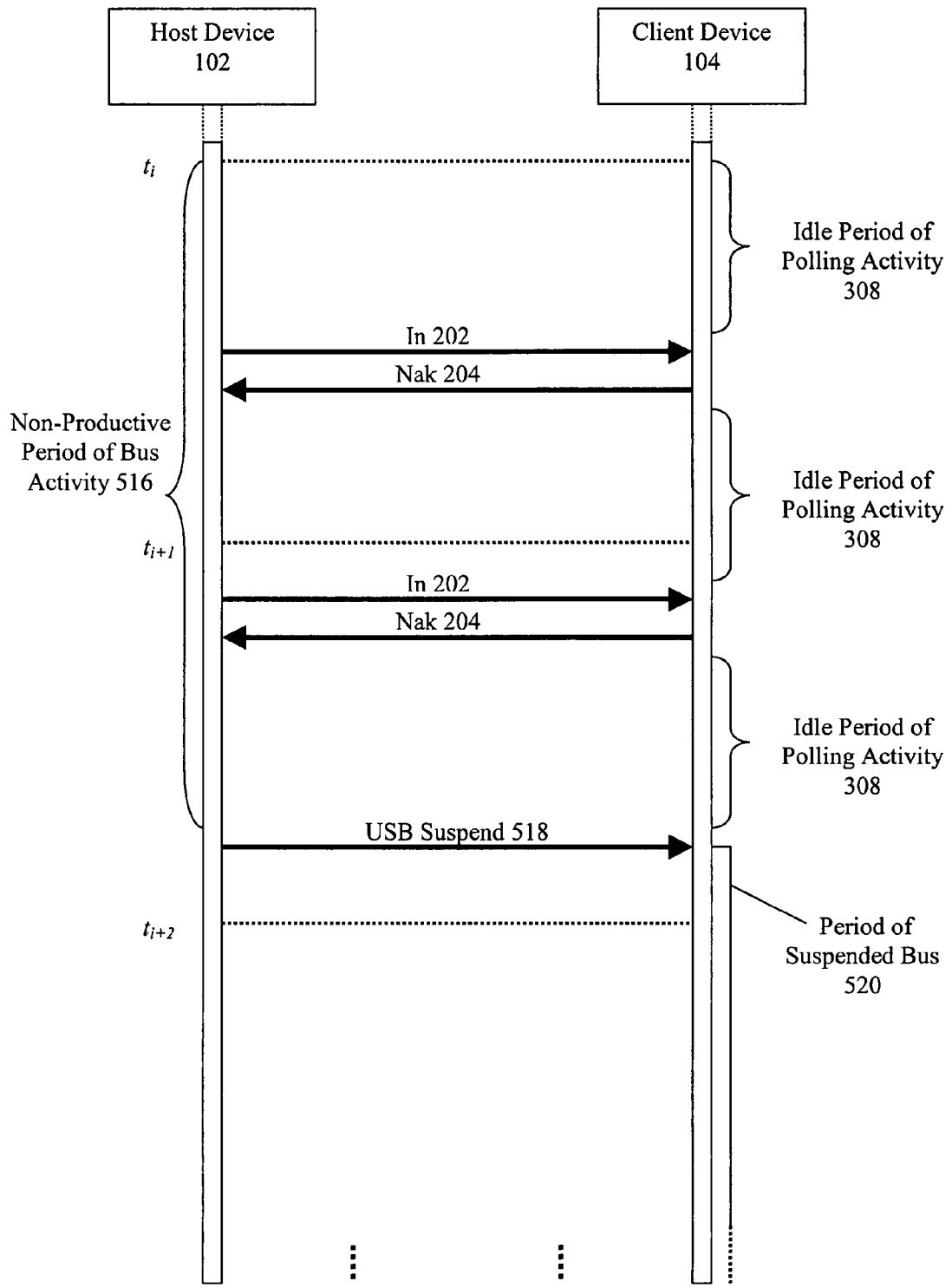
FIG. 5 is a sequence diagram illustrating a third polling sequence according to a third embodiment of the present invention.

FIG. 5 is a sequence diagram illustrating a polling scheme in accordance with another embodiment of the present invention. For the purposes of FIG. 5, it is assumed that the host 102 or client device 104 has already detected the presence of a non-productive period of polling activity 306, and has reduced the frequency of polling per FIG. 3.

In the embodiment depicted by FIG. 5, the host device 102 detects a period of non-productive bus activity 516. In one variant, detection of this period is based at least in part on a series of consecutive NAKs 204, as in the embodiment illustrated in FIG. 3. In another variant, detection of this period is based at least in part on the detection of successive idle periods of polling activity 308. In still another variant, detection of this period 516 is based on the actual amount of data that the client 104 has transferred to the host 102 over a certain period of time. Yet other schemes will be recognized given the foregoing discussion.

Once the second period of non-productive bus activity 516 has been detected, the host 102 causes the client to enter a pause or suspension condition (e.g., USB SUSPEND) 518 at a time $t_{i+2}$ thus commencing a period of suspended bus 520. The client 104 accordingly suspends all bus communication to the host 102. In this manner, polling between host device 102 and client device 104 is halted until the client device 104 subsequently sends a wakeup (e.g., USB RESUME) to the host 102 (as discussed below). This advantageously saves power in both the host and the client device, and provides only minimal latency.

The suspend condition may also be issued in a multicast or even broadcast fashion onto the bus (e.g., addressed to a subset of devices on the bus, or alternatively all devices on the bus) so as to terminate polling from multiple devices simultaneously. This can also be performed in a staggered or similar fashion; e.g., "suspend" a first polling host; wait to see the results (e.g., monitor bandwidth, processor cycles, power, etc.), and then suspend second and subsequent hosts accordingly as needed. Similarly, a client (or host) may be programmed to suspend or "back off" based on a scheme, such as where an RNG (random number generator, e.g., LFSR or the like) is used to generate a random backoff interval for suspending polling, akin to techniques used in CSMA/CD or other medium access technologies. In this fashion, polling from multiple devices does not all cease simultaneously, but rather according to a more "graceful degradation". Similarly, a slotted technique (e.g., ALOHA or the like) can be used to assign hosts time slots for receiving and/or implementing the suspend condition.

Figure 6:
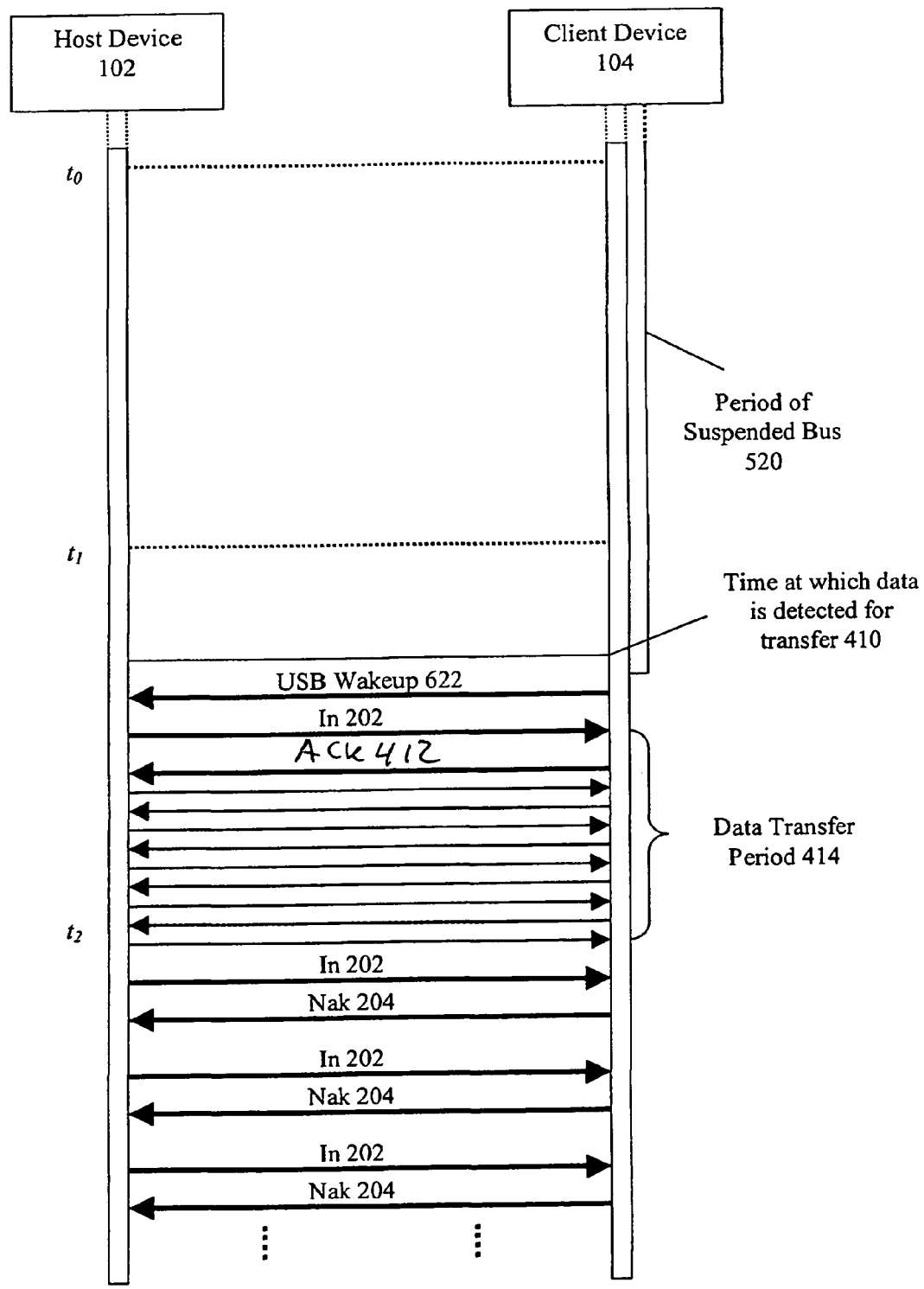
FIG. 6 is a sequence diagram illustrating a fourth polling sequence according to a fourth embodiment of the present invention.

FIG. 6 is a sequence diagram illustrating a polling scheme in accordance with yet another embodiment of the present invention. For the purposes of FIG. 6, it is assumed that the client device 104 has already entered a USB suspend state 520 per FIG. 5.

In the embodiment shown in FIG. 6, the client device 104 periodically monitors itself to determine whether it has data to transfer to the host device 102. The bus remains in a suspended state 520 during this time. After the data is detected for transfer at time 410, the client device 104 sends a USB resume 622 to host device 102. In one variant, receipt of the USB resume 622 received by the host device 102 acts as a signal to the host device 102 to resume polling at its original frequency (i.e., the frequency given in the period of $t_0$-$t_1$ in FIG. 3).

In another variant, upon receiving the USB resume 622, host device 102 continues its polling at the adjusted frequency (i.e., the frequency given in the period after $t_1$ in FIG. 3), and enters its original polling frequency only upon receiving the ACK 412.

The transfer of data then occurs during data transfer period 414. After the transfer has completed, the polling of client device 104 continues at its original frequency, and in one variant, the process repeats per FIG. 3.

Figure 7B:
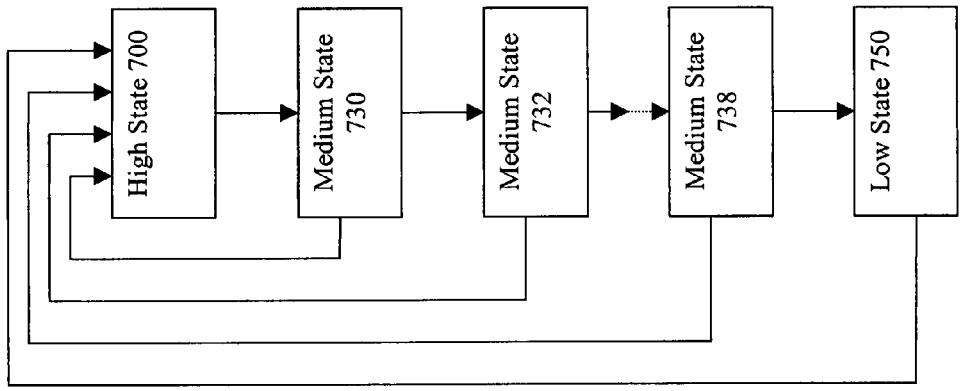
FIG. 7b is a logical flow diagram illustrating at a high-level the operation of a state machine in accordance with another embodiment of the present invention.
Figure 7A:
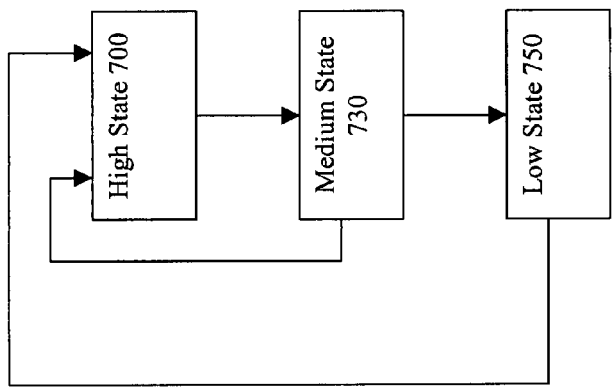
FIG. 7a is a logical flow diagram illustrating at a high-level the operation of a state machine in accordance with one embodiment of the present invention.

FIG. 7a is a high level illustration of a generalized state machine comprising three states per one embodiment of the present invention. In this embodiment, these states are all states of the host device 102, but each state transition is driven by the client 104. As shown in FIG. 7a, the set of states comprises: (i) a high state 700, representing a state of high-frequency polling; (ii) a low state 750, representing a state of lower-frequency polling; and (iii) an intermediate ("medium") state 730, representing a state of polling at a lower frequency than the high state 700, but at a higher frequency than the low state 750. It will be appreciated that while "high", "medium", "low" states are described, more or less numbers of states may be used, and further these states may relate to one or more parameters other than polling frequency. For example, the "high" state might comprise a comparatively high level of immediacy (low latency), comparatively high state of priority for data transfer requests coming from a certain client, and so forth.

As shown in FIG. 7a, medium state 730 and low state 750 both comprise state transitions to high state 700, high state 700 comprises a state transition to medium state 730, and medium state 730 comprises a state transition to low state 750. Other transition logic can be utilized as well, however. For simplicity, transition elements have been omitted from this Figure, as they are better shown by FIG. 8.

Figure 8:
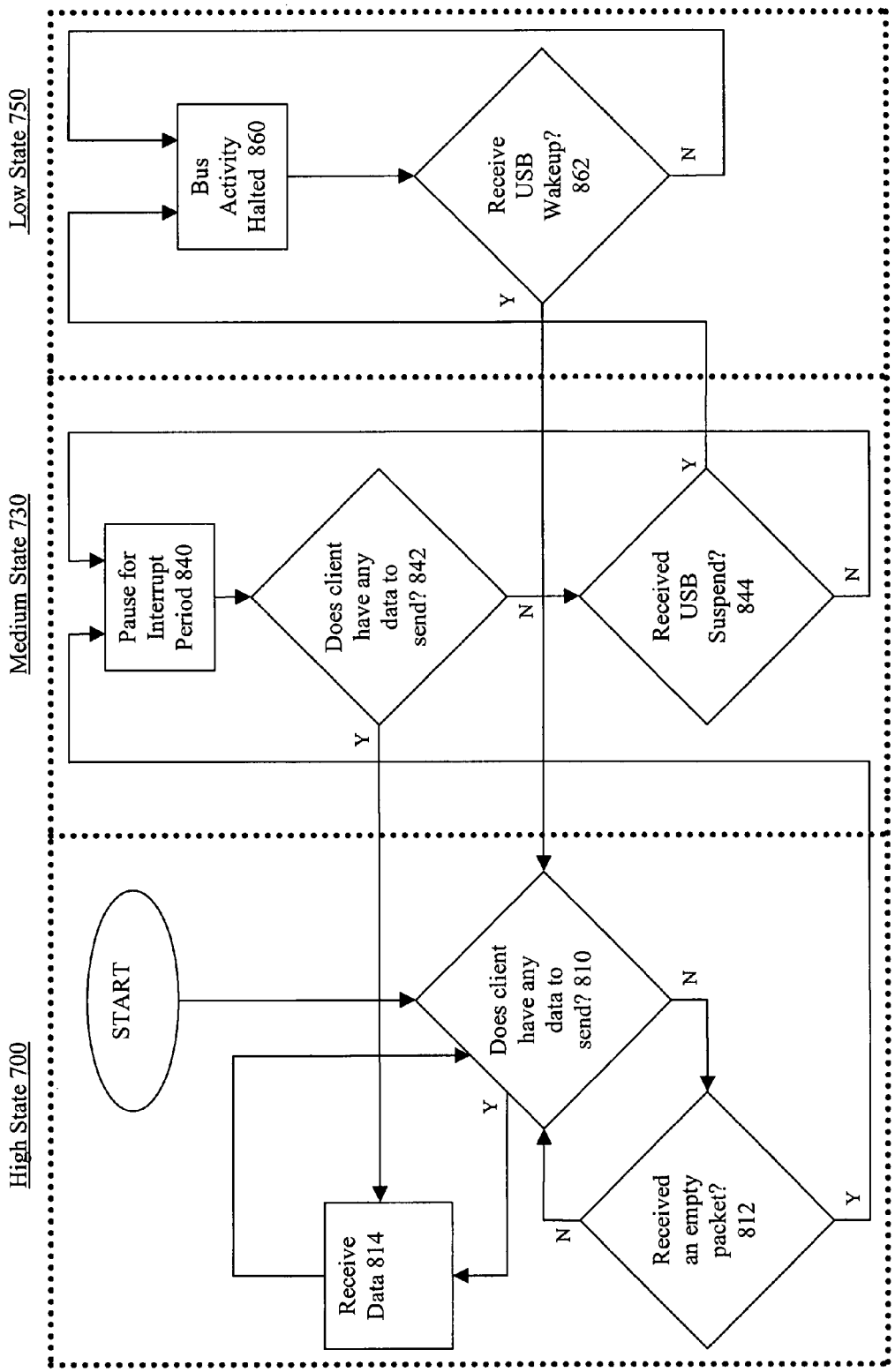

FIG. 8 is an illustration of one embodiment (implementation) of the state machine depicted in FIG. 7a. In FIG. 8, the high state 700, medium state 730, and low state 750 are each denoted by dotted lines. Arrows crossing these lines indicate state transitions. The physical implementation of state machines (whether in software, firmware, hardware, or combinations thereof, including the well known FSM or finite state machine, and ED-FSM or event-driven FSM) is well known in the electronic and computer arts, and accordingly not described further herein.

In the embodiment illustrated by FIG. 8, the state machine begins in high state 700. Upon encountering the decision block 810, the state machine determines whether the client 104 has any data to send to the host 102. In this embodiment, this logic is accomplished by transmitting an in-request 202 from the host 102 to the client 104, although other techniques (e.g., passive listening for communications or signals from the client as described elsewhere herein) can be used as well. If the client 104 has data to send, the data is transmitted at step 814, and the process repeats until all data designated for transfer has been sent to the host 102. In situations where no data is available to transfer to the host 102, the state machine at decision block 812 then determines whether it has received a transition signal. As previously noted, one embodiment of this signal comprises an empty data packet 307, but other signals or communication mechanisms may instead be used consistent with the scope of this invention.

Note that decision blocks 810 and 812 do not necessarily have to be performed sequentially as shown by FIG. 8; FIG. 8 is merely illustrative. In various embodiments, decision blocks 810 and 812 constitute independent logic, threads, processes, modules and/or combinations thereof. For example, in one embodiment, decision block 812 is handled by an independent process that will generate an interrupt upon receiving the empty data packet 307. This interrupt will trigger the state transition to the medium state 730.

Furthermore, the frequency of evaluating these conditions need not necessarily be equal or symmetric, even when these steps 810 and 812 are executed sequentially. For example, in one embodiment, the decision block 812 is evaluated five (5) times for every one (1) time the decision block 810 is evaluated. Thus, these frequencies can be configured and adjusted in a myriad number of ways and to accomplish one or more goals, for example, to minimize CPU usage or to facilitate or enhance immediacy of responsiveness in the host device 102. All such configurations fall within the scope of the present invention.

Once the signal has been received by the host (in this case, empty data packet 307), the state machine then transitions to the medium state 730. As stated earlier, the exemplary medium state 730 comprises a lower polling frequency than the high state 700. In one variant, achieving the lower polling frequency is accomplished by interleaving delay periods between periods of active polling. For example, the client device 104 specifies the delay or mask period to the host 102, and the host 102 switches from bulk polling to interrupted or masked polling using this specified delay period (herein identified as the interrupt period 840).

In another variant, delay is achieved by sleeping a process or thread for a fixed period of time. In either event, the host 102 pauses for the delay period before polling the client 104 again at decision block 842. If the client 104 has any data to send to the host 102 at this point, the state machine transitions back to the high state 700, and the process repeats as described above. In one embodiment, the transition element comprises an ACK 412, but other signals, events, or combinations thereof can be used for this purpose. If the client 104 does not have any data to send to the host 102, then at decision block 844, the state machine determines whether it has received a USB suspend transition 518.

As before, decision blocks 842 and 844 do not need to be performed sequentially as shown in FIG. 8; FIG. 8 is merely illustrative. The decision blocks 842 and 844 may constitute independent logic, threads, processes, modules or combinations thereof. For example, in a preferred embodiment, decision block 844 is an independent process that will generate an interrupt upon receiving a USB suspend detection or transition 518. This interrupt will trigger the state transition to the low state 750. Furthermore, as previously described, the frequency of evaluating these conditions need not necessarily be equal or symmetric, even when steps 842 and 844 are executed sequentially.

After the USB suspend transition has been sent from the client 104 and received by the host 102, bus activity is halted at step 860. During this time, the host 102 does not poll the client 104. Instead, the host periodically listens for a USB resume command as sent from the client 104 or a proxy (i.e., a designated entity other than the client, such as a bus master, another client, etc. which may be tasked with issuing wakeup commands). In some embodiments, this listening period is implemented using interrupts and/or exceptions. In other embodiments, a receiver object is periodically polled.

When the USB resume command 622 is ultimately received at the host 102, the state machine transitions from the decision block 862 back to decision block 810 of the high state 700, and the process then repeats.

FIG. 7b is a high level illustration of a state machine comprising n states per another embodiment of the present invention. These n states are in the illustrated embodiment each states of the host device 102, but are driven by the client 104. As shown in FIG. 7b, the set of states comprises: (i) a high state 700, representing a state of comparatively high-frequency polling; (ii) a low state 750, representing a state of comparatively low-frequency polling; and (iii) a plurality of intermediate or medium states 730, 732 . . . 738, representing successively graded or incremented polling frequencies. The gradations between any of the aforementioned states (including those previously described with respect to FIG. 7a) need not be constant, or linear, and may in fact also vary as a function of operational conditions if desired. For example, as lower delay or latency is required, the different states may be shifted upward in frequency, albeit maintaining the same spacing. As another alternative, a non-linear (e.g., exponential or logarithmic) gradation may be used, such that more states are "bunched" at one end of the frequency spectrum; e.g., high=X, $medium_1$=X/2, $medium_2$=X/4, $medium_3$=X/8, $medium_4$=X/16, and low=X/32, and so forth.

As shown in FIG. 7b, the plurality of medium states 730, 732 . . . 738 and low state 750 each comprise state transitions to high state 700, high state 700 comprises a state transition to medium state 730, medium state 738 comprises a state transition to the low state 750, and every other medium state in said plurality comprises a state transition to an immediately lower medium state. Other transition logic can be utilized as well, however.

Figure 9:
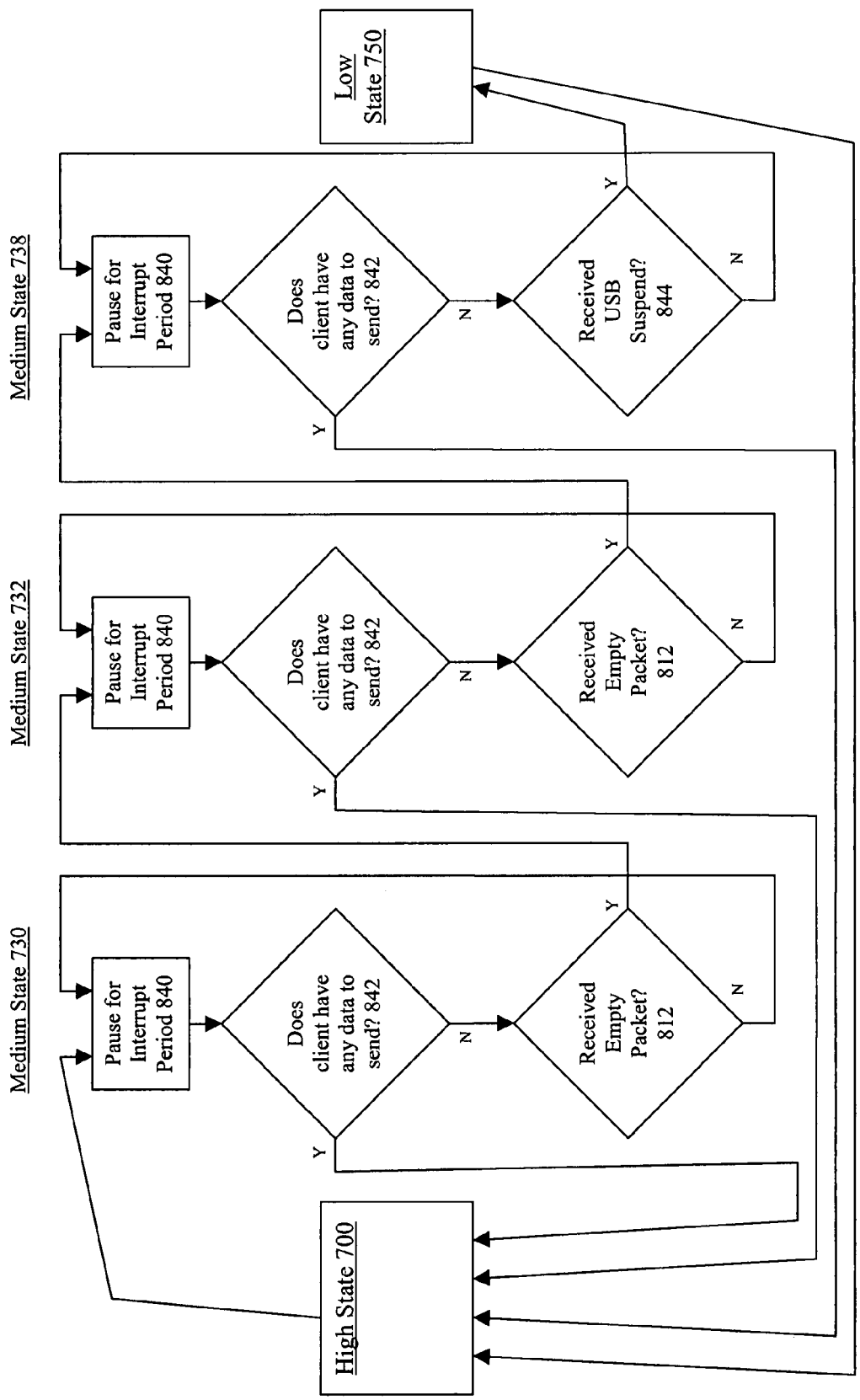
FIG. 9 is a logical flow diagram illustrating one exemplary implementation of the state machine depicted by FIG. 7b.

FIG. 9 is a low level illustration of one embodiment of the state machine as depicted in FIG. 7b. For simplicity, the high state 700 and low state 750 are represented by small boxes, as depicted in FIG. 8.

FIG. 9 illustrates an n-state machine, with a total of n-3 number of medium states (in this example, medium states 730 and 732 from FIG. 9) existing between the high state 700 and medium state 738. Generally speaking, the n-state machine in FIG. 9 operates as in FIG. 8, but a significant difference is that the pauses associated with each interrupt period 840 become progressively longer as the machine transitions to lower and lower states. Thus, the n-state machine of FIG. 9 allows the client device 104 a more graduated approach in slowing down the frequency of polling as n gets larger.

In one variant, the host device 102 keeps track of the state it is presently in, and transitions appropriately upon receiving an empty data packet 307. In another variant, a delay period is kept locally at the host 102, and incremented upon receipt of each transition signal. The delay period is then reset upon receipt of an ACK 412. In yet another variant, the client device 104 transmits the appropriate delay or interrupt period 840 (or frequency) to the host device 102 along with the transition signal. In still other variants, the client 104 sends out different signals to the host 102, wherein each signal is interpreted differently by the host 102 as to indicate a transition into a specific state.

As previously noted, state transitions may also occur according to different rules or schemes (e.g., selectively skipping one or more states, etc.), and these rules can be imposed via the aforementioned signals or commands issued by the client. For example, in one embodiment, the client-issued command may include a code (e.g., one or more bits within packet, or the like) that denote the individual state transition (or transition scheme) to use. Two (2) bits ($2^2$ or 4 states) might be used, for example, to indicate four different transition schemes to employ within the host. The selection of the appropriate scheme might be based on parameters within the client (e.g., remaining battery capacity, data activity, processor pipeline shutdown (sleep mode), etc.), such that certain of the selectable transition schemes are optimized for different situations. If battery conservation is the critical consideration or attribute, a scheme which optimizes this would be selected over one which, say, optimizes primary channel bandwidth conservation (which may be the same scheme, but not necessarily).

Also, while the foregoing embodiments have been described primarily in the context of a host state machine that is substantially under the control of or driven by an associated client, it will be appreciated that other approaches may be used. For example, in one alternate embodiment, the state machine of the host is controlled or driven by both a host process and the client process, such as where power/overhead/bandwidth consumption associated with both devices is considered in the operation of the state machine of the host.

Moreover, a client-based state machine may be employed, such that the host is the driver.

As yet another alternative, the client may be the driver of its own state machine, with the host basically assuming a purely "reactive" roll (i.e., only initiating, terminating, or changing polling profiles upon direction of the client).

Myriad other state machine configurations and control schemes will be appreciated by those of ordinary skill in the art given the foregoing disclosure.

In other embodiments, different polling schema are utilized, such as where e.g., the aforementioned host or client state machine traverses directly to a target state (e.g., the lowest state) based on a deterministic, speculative or probabilistic determination of whether a data transfer will occur during a prescribed period. In one variant, the polling frequency or interval is set so as to not provide an appreciable delay if data is received or processed by the client immediately after the last poll by the host (i.e., longest possible delay).

In another variant, a deterministic approach is used such that indicia of data activity within the client device is used as an input to the state machine control process. For example, if the client processor pipeline is put in "sleep" mode (i.e., for power conservation), and it takes five (5) machine cycles to wake the pipeline and being processing data for transmission, the poll delay can be relaxed accordingly, since a poll event falling anywhere prior to the pipeline "wake" state being achieved will not be serviced in any case. Similarly, if the FIFO or buffer chain of the client device data path has a latency associated with it, and a look-ahead operation (buffer "sniff" or the like) indicates that no incoming data has been received, then the poll delay can be set at least as long as the data path latency.

Alternatively, a probabilistic approach can be used, such as for example where it is known that the need to transfer data out of the client device over the bus is distributed according to a probability, speculative, or similar function. Consider the illustrative case wherein data transfers after 100 or more "non-productive" polling periods statistically or historically occur with very low frequency (say, only 10% of the time). In this fashion, the state machine control logic may be programmed to access this information to determine an appropriate sampling frequency. In the foregoing illustrative case, this might equate to lowering the sampling frequency to the lowest level or state, even though a "hit" (data transfer event) may cause a significant latency in response, since 90% (100-10%) of the time no data event will follow, and hence no such delay will be incurred.

A polling "burst" mode is also possible, wherein the client (or host) can invoke an accelerated polling rate during times when minimum latency is desired or required. For example, the maximum polling rate can be invoked when the most rapid possible transfer of data is required. This short-term rate may even be faster than the "high" rate previously described with respect to FIGS. 7a and 7b, and may be at the expense of power consumption, bandwidth consumption, and/or processor overhead. Accordingly, it would typically only be invoked on an as-needed basis, or for very sort durations.

Lastly, it is noted that while the exemplary embodiments of the invention are described primarily in terms of a host-client architecture wherein the data transfer is between the client and the host, this is by no means a requirement. For example, the "host" device responsible for polling may be acting as a network proxy for another device to which the data is actually being transmitted from the client, or from which data is being sent to the client. Moreover, any considerations of bandwidth consumption may reflect the conditions of the bus used to transmit/receive the data, which may or may not be the same bus as that over which the communications between the "host" and client occur.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A data device adapted to communicate with another device over a bus, the data device comprising:
   logic configured to poll the second device according to a first of a plurality of polling schemes;
   logic configured to determine when polling is non-productive;
   logic configured to select a progressively lower rate polling scheme from the plurality of polling schemes, responsive to multiple determinations of non-productive polling;
   logic configured to receive an indication of available data for transfer;
   logic configured to, responsive to the indication of available data, request resumption of the first polling scheme.

2. The data device of claim 1, wherein the determination of non-productive polling comprises a number of Non-Acknowledgements (NAKs).

3. The data device of claim 2, wherein the number of NAKs is dynamically adjusted.

4. The data device of claim 1, wherein the determination of non-productive polling is determined from an amount of data transferred from the data device to the another device.

5. The data device of claim 1, wherein the determination of non-productive polling is determined from a rate of data transferred from the data device to the another device.

6. The data device of claim 1, wherein the determination of non-productive polling is determined from a duration of Non-Acknowledgements (NAKs).

7. The data device of claim 1, wherein the another device comprises a Universal Serial Bus (USB) compliant client device.

8. The data device of claim 1, wherein the plurality of polling schemes differ in frequency.

9. The data device of claim 8, wherein at least one of the plurality of polling schemes comprises a halted polling activity scheme.

10. A method for communicating with a second device over a serial bus with a first device, comprising:
    polling the second device according to a first polling scheme;
    receiving an indication of non-productive polling;
    polling the second device according to one of a plurality of progressively lower rate polling schemes, substantially responsive to receiving multiple indications of non-productive polling
    where the indication of non-productive polling is based on at least data being unavailable for transfer;

receiving an indication of available data for transfer; and
requesting resumption of the first polling scheme, substantially responsive to the indication of available data.

11. The method of claim 10, wherein the indication of non-productive polling comprises a number of Non-Acknowledgments (NAKs).

12. The method of claim 10, wherein the second device comprises a Universal Serial Bus (USB) compliant client device.

13. The method of claim 10, wherein at least one of the plurality of progressively lower rate polling schemes comprises not polling.

14. A data device adapted to communicate with another device over a bus, the data device comprising:
    logic configured to receive polls from the second device according to a first of a plurality of progressively lower rate polling schemes;
    logic configured to determine when polling is non-productive;
    logic configured to request a second of the plurality of progressively lower rate polling schemes, response to multiple determinations of non-productive polling;
    logic configured to predict impending data for transfer; and
    logic configured to, responsive to the prediction of the impending data, send a request for resumption of the first polling scheme.

15. The data device of claim 14, wherein the determination of non-productive polling is based on a number of Non-Acknowledgements (NAKs) exceeding a threshold value of NAKs.

16. The data device of claim 14, wherein the determination of non-productive polling is determined from a rate of data transferred from the data device to the another device.

17. The data device of claim 14, wherein the prediction is based on activity of a receive/transmit buffer in the device.

18. The data device of claim 14, wherein the another device comprises a Universal Serial Bus (USB) compliant client device.

19. The data device of claim 14, wherein the plurality of progressively lower rate polling schemes differ in frequency.

20. The data device of claim 19, wherein at least one of the plurality of progressively lower rate polling schemes comprises a halted polling activity scheme.

\* \* \* \* \*